United States Patent
Inomata

(10) Patent No.: US 9,950,258 B2
(45) Date of Patent: Apr. 24, 2018

(54) SYSTEM, PROGRAM, AND METHOD FOR OPERATING SCREEN BY LINKING DISPLAY AND PLURALITY OF CONTROLLERS CONNECTED VIA NETWORK

(71) Applicant: COLOPL, INC., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/273,605

(22) Filed: Sep. 22, 2016

(65) Prior Publication Data

US 2017/0007926 A1    Jan. 12, 2017

Related U.S. Application Data

(63) Continuation of application No. PCT/JP2015/083421, filed on Nov. 27, 2015.

(30) Foreign Application Priority Data

Nov. 28, 2014 (JP) .................................. 2014-240768

(51) Int. Cl.
*A63F 13/53* (2014.01)
*A63F 13/52* (2014.01)
(Continued)

(52) U.S. Cl.
CPC ............ *A63F 13/52* (2014.09); *A63F 13/211* (2014.09); *A63F 13/212* (2014.09); *A63F 13/25* (2014.09);
(Continued)

(58) Field of Classification Search
CPC ...................................... A63F 13/00
See application file for complete search history.

(56) References Cited

U.S. PATENT DOCUMENTS 5,738,583 A * 4/1998 Comas ................. A63F 13/12
463/40
2002/0165028 A1    11/2002 Miyamoto et al.
(Continued)

FOREIGN PATENT DOCUMENTS

JP    2002-325963 A    11/2002
JP    2003-325973 A    11/2003
(Continued)

OTHER PUBLICATIONS

International Search Report in International Patent Application No. PCT/JP2015/083421, dated Feb. 2, 2016.
(Continued)

*Primary Examiner* — Omkar Deodhar
(74) *Attorney, Agent, or Firm* — Hauptman Ham, LLP

(57) ABSTRACT

An apparatus includes a transmission portion configured to transmit a two-dimensional image to a plurality of controllers through a network. The two-dimensional image is a simplification of a three-dimensional image based on information of a selected application. The transmission portion is further configured to transmit positional information for a first object to the plurality of controllers. The positional information for the first object is receivable from a first controller. The apparatus further includes a reception portion configured to receive positional information for a second object from a second controller through the network based on the positional information for the first object and the two-dimensional image. The apparatus further includes an image generating and outputting portion configured to generate a first image within a three-dimensional virtual space based on the positional information for the first object and the positional information for the second object, and to output the first image.

11 Claims, 12 Drawing Sheets

(51) Int. Cl.
- *A63F 13/26* (2014.01)
- *A63F 13/212* (2014.01)
- *A63F 13/323* (2014.01)
- *A63F 13/33* (2014.01)
- *A63F 13/25* (2014.01)
- *A63F 13/35* (2014.01)
- *A63F 13/803* (2014.01)
- *A63F 13/211* (2014.01)
- *A63F 13/5255* (2014.01)

(52) U.S. Cl.
CPC ............ *A63F 13/26* (2014.09); *A63F 13/323* (2014.09); *A63F 13/33* (2014.09); *A63F 13/35* (2014.09); *A63F 13/5255* (2014.09); *A63F 13/803* (2014.09)

(56) References Cited

U.S. PATENT DOCUMENTS

| | | |
|---|---|---|
| 2003/0216177 A1 | 11/2003 | Aonuma et al. |
| 2004/0266529 A1 | 12/2004 | Chatani |
| 2014/0349753 A1 | 11/2014 | Imai et al. |
| 2015/0243078 A1* | 8/2015 | Watson .................. A63F 13/26 345/547 |

FOREIGN PATENT DOCUMENTS

| | | |
|---|---|---|
| JP | 2006-215602 A | 8/2006 |
| JP | 2007-527258 A | 9/2007 |
| JP | 2010-259586 A | 11/2010 |
| JP | 2014-18324 A | 2/2014 |
| WO | 2013/111247 A1 | 5/2015 |

OTHER PUBLICATIONS

Written Opinion in International Patent Application No. PCT/JP2015/083421, dated Feb. 2, 2016.

Office Action in JP Application No. 2014-240768, dated Oct. 14, 2015.

Notice of Allowance in JP Application No. 2014-240768, dated Feb. 3, 2016.

* cited by examiner

SYSTEM, PROGRAM, AND METHOD FOR OPERATING SCREEN BY LINKING DISPLAY AND PLURALITY OF CONTROLLERS CONNECTED VIA NETWORK

RELATED APPLICATION

The present application is a continuation of International Application Number PCT/JP2015/083421, filed Nov. 27, 2015, which claims priority from Japanese Application Number 2014-240768, filed Nov. 28, 2014, the disclosures of which application are hereby incorporated by reference herein in their entirety.

TECHNICAL FIELD

The present description relates to a system, a method, and a program for operating a screen by linking a display and a plurality of controllers connected to the display through a network, and more particularly, to a system for linking an apparatus main unit and controllers connected to the apparatus main unit through a network, to thereby allow different users to conduct screen operations for a display of the apparatus main unit and displays of the controllers.

BACKGROUND ART

Hitherto, in a system for operating a screen through use of a controller via an apparatus main unit, the controller itself does not have a function of communicating to/from a network, and hence a controller dedicated to the apparatus main unit is directly connected to the apparatus main unit. Therefore, when a plurality of controllers are connected to the apparatus main unit through a network existing outside the apparatus main unit, an apparatus main unit needs to be provided for each of the plurality of controllers.

In particular, there is known a head-mounted display (HMD) to be worn around a head of a user to allow an image to be presented to the user by a display or the like placed in front of his or her eyes. The related-art HMD requires a controller dedicated to an apparatus main unit.

SUMMARY

Technical Problem

In the system according to the above-mentioned related art, the controller itself does not have a function of connecting the controller to an external network, and is therefore connected to an apparatus main unit whenever the controller itself is connected to the Internet. In this case, apparatus main units need to be separately provided for the plurality of controllers. That is, the plurality of controllers are connected to the external network, e.g., the Internet, via the apparatus main units separately connected to the controllers.

In addition, for connection to the apparatus main unit connected to the HMD, it is necessary to carry around a controller dedicated to the same apparatus main unit.

The present description has been made in view of the above-mentioned problems, and has an object to provide a system for linking a display (for example, HMD) and a plurality of controllers having a function of communicating to/from an external network to each other. Further, the present description includes a controller having a function of communicating to/from the outside, and can therefore download software required for connection from an external server in order to be connected to an apparatus main unit. Therefore, the controller does not need to be dedicated to the apparatus main unit, and a generally available terminal, e.g., a mobile terminal or a smartphone, can be used.

Solution to Problem (1) One embodiment of the present description relates to a system and an apparatus, which is configured to output a generated image to a display, the apparatus being connected to a plurality of controllers through a network, the apparatus including:
  a transmission portion configured to transmit information obtained by simplifying information on an application selected by a first user, to the plurality of controllers through the network, and to further transmit information obtained by simplifying information on a first object operated by the first user in the application being executed by the first user to the plurality of controllers through the network;
  a reception portion configured to receive information on a second object operated by a second user who operates one operating controller among the plurality of controllers from the one operating controller through the network based on the information obtained by simplifying the information on the first object and the information obtained by simplifying the information on the application; and
  an image generating and outputting portion configured to generate the image in which the first object and the second object are arranged, based on the information on the first object and the received information on the second object, and to output the image to the display connected to the apparatus.

According to the present description, the apparatus including the display can be connected to a plurality of controllers having a function of communicating to/from the outside, and an operation conducted on one controller among the plurality of controllers can be reflected in the display of the apparatus. Further, according to the present description, simplified operation information relating to the first object operated by the first user who operates the controller connected to the apparatus can be transmitted to the plurality of controllers, and operation information relating to the second object operated by the second user who operates the one controller can be received from the one controller based on the simplified operation information relating to the first object, to thereby be able to reflect the operation information on the respective objects in the display connected to the apparatus. With this configuration, the present description provides a system that can be joined by a plurality of users through the network.

(2) Further, according to one embodiment of the present description, the plurality of controllers and the apparatus are connected to each other by a controller-side interface program of each of the plurality of controllers, which is received from a server through an external network, and an apparatus-side interface program of the apparatus.

According to the present description, the controller itself has a function of communicating to/from the external network, and hence the controllers can communicate to/from each other through the external network without the need to be connected to the apparatus main unit. In addition, the controller can easily join a game being executed on the apparatus main unit by downloading software required for connection to the controller connected to the display from the external server. Therefore, the controller does not need to be dedicated to the apparatus main unit.

The above-mentioned and other features and advantages of the present description become apparent from the following more specific descriptions of embodiments of the present description, the accompanying drawings, and the appended claims.

DESCRIPTION OF EMBODIMENTS

Figure 1A:
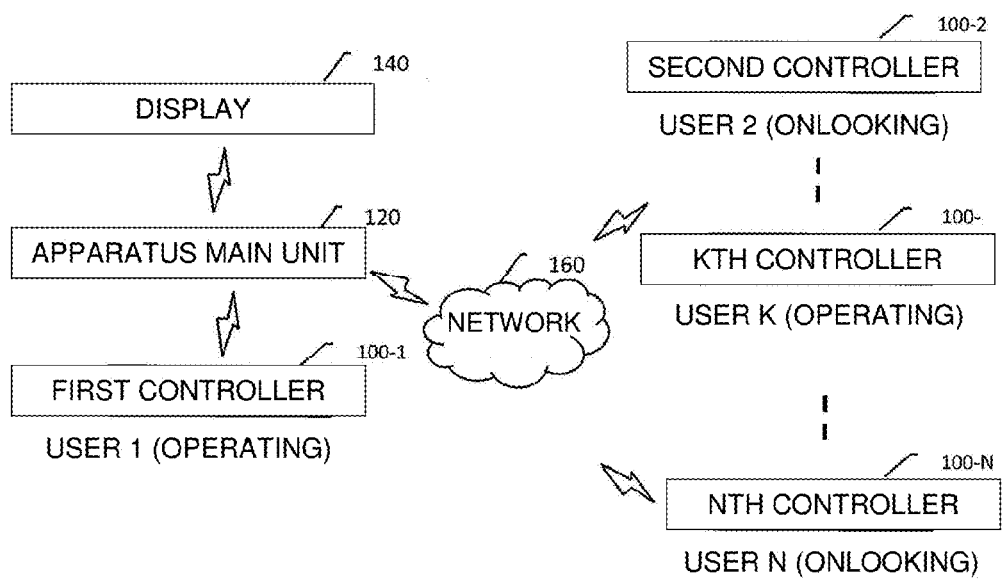
FIG. 1A is a system block diagram for illustrating a system according to at least one embodiment.

First, at least one embodiment is described with reference to a list of contents thereof. An image display method and a program according to at least one embodiment include the following configurations.

(Item 1)

An apparatus, which is configured to output, to a head-mounted display, a first generated image within a three-dimensional virtual space that changes in association with a motion of a head of a first user wearing the head-mounted display, the apparatus being connected to a plurality of portable controllers through a network, the apparatus including:

a transmission portion configured to transmit a two-dimensional game image, which is obtained by simplifying a three-dimensional game image of information on an application selected by the first user who operates the apparatus, to the plurality of portable controllers through the network, and to further transmit positional information on a first object operated by the first user in the application being executed by the first user to the plurality of portable controllers through the network;

a reception portion configured to receive positional information on a second object operated by a second user who operates one controller among the plurality of portable controllers from the one controller through the network based on the positional information on the first object and the two-dimensional game image obtained by simplifying the three-dimensional game image of the information on the application; and an image generating and outputting portion configured to generate the first generated image within the three-dimensional virtual space, in which the first object and the second object are arranged, based on the positional information on the first object and the received positional information on the second object, and to output the first generated image to the head-mounted display connected to the apparatus.

(Item 2)

An apparatus according to Item 1, in which the plurality of portable controllers and the apparatus are connected to each other by a controller-side interface program of each of the plurality of portable controllers, which is received from a server through an external network, and an apparatus-side interface program of the apparatus.

(Item 3)

An apparatus according to Item 1, in which the transmission portion is further configured to transmit the received positional information on the second object to other controllers excluding the one controller operated by the second user among the plurality of portable controllers.

(Item 4)

A plurality of portable controllers, which are configured to output a second generated image being two-dimensional to displays, the plurality of portable controllers each being connected to an apparatus through a network, the plurality of portable controllers each including:
- a reception portion configured to receive a two-dimensional game image, which is obtained by simplifying a three-dimensional game image of information on an application selected by a first user who operates the apparatus based on a first generated image within a three-dimensional virtual space that changes in association with a motion of a head of the first user wearing a head-mounted display, from the apparatus through the network, and to further receive positional information on a first object operated by the first user in the application being executed by the first user from the apparatus through the network; and
- an image generating and outputting portion configured to generate the two-dimensional game image obtained by simplifying the three-dimensional game image of the information on the application and the second generated image being two-dimensional, in which the first object is arranged, based on the positional information on the first object, and to output the two-dimensional game image and the second generated image to the displays of the plurality of portable controllers.

(Item 5)

One controller among the plurality of portable controllers of Item 4, in which the image generating and outputting portion of the one controller is further configured to generate the second generated image being two-dimensional, in which the second object is arranged, based on positional information on the second object operated by a second user who operates the one controller, and to output the second generated image to the one controller.

(Item 6)

One controller according to Item 5, further including a transmission portion configured to transmit the positional information on the second object to the apparatus.

(Item 7)

A system, including:
- an apparatus configured to output, to a head-mounted display, a first generated image within a three-dimensional virtual space that changes in association with a motion of a head of a first user wearing the head-mounted display, the apparatus being operated by the first user; and
- a plurality of portable controllers, which are connected to the apparatus through a network, and are configured to output a second generated image being two-dimensional to displays of the plurality of portable controllers, in which:
- the apparatus includes:
  - a transmission portion configured to transmit a two-dimensional game image, which is obtained by simplifying a three-dimensional game image of information on an application selected by the first user, to the plurality of portable controllers through the network, and to further transmit positional information relating to a first object operated by the first user in the application being executed by the first user to the plurality of portable controllers through the network;
  - a reception portion configured to receive positional information on a second object operated by a second user from one controller through the network based on the positional information on the first object and the two-dimensional game image obtained by simplifying the three-dimensional game image of the information on the application; and
  - an image generating and outputting portion configured to generate the first generated image within the three-dimensional virtual space, in which the first object and the second object are arranged, based on the positional information on the first object and the received positional information on the second object, and to output the first generated image to the head-mounted display connected to the apparatus;
- the one controller of the plurality of portable controllers is operated by the second user; and
- the one controller includes:
  - a reception portion configured to receive the two-dimensional game image, which is obtained by simplifying the three-dimensional game image of the information on the application selected by the first user, from the apparatus through the network, and to further receive the positional information on the first object operated by the first user in the application being executed by the first user from the apparatus through the network;
  - a transmission portion configured to transmit the positional information relating to the second object operated by the second user to the apparatus through the network based on the two-dimensional game image obtained by simplifying the three-dimensional game image of the information on the application and the positional information on the first object; and
  - an image generating and outputting portion configured to generate the second generated image being two-dimensional, in which the first object and the second object are arranged and which is generated based on the received positional information on the first object and the received positional information on the second object, and to output the second generated image to the display of the one controller.

(Item 8)

A program for causing a processor to execute a method of outputting, to a head-mounted display of an apparatus, a first generated image within a three-dimensional virtual space that changes in association with a motion of a head of a first user wearing the head-mounted display, the apparatus being connected to a plurality of portable controllers through a network, the method including the steps of:
- transmitting a two-dimensional game image, which is obtained by simplifying a three-dimensional game image of information on an application selected by the first user who operates the apparatus, to the plurality of portable controllers through the network, and further transmitting positional information on a first object operated by the first user in the application being executed by the first user to the plurality of portable controllers through the network;
- receiving positional information on a second object operated by a second user who operates one controller among the plurality of portable controllers from the one controller through the network based on the positional information on the first object and the two-dimensional game image obtained by simplifying the three-dimensional game image of the information on the application; and
- generating and outputting an image, the step of generating and outputting an image including generating the first generated image within the three-dimensional virtual space, in which the first object and the second object are arranged, based on the positional information on the first object and the received positional information on the second object, and outputting the first generated image to the head-mounted display connected to the apparatus.

(Item 9)

A program according to Item 8, in which the plurality of portable controllers and the apparatus are connected to each other by a controller-side interface program of each of the plurality of portable controllers, which is received from a server through an external network, and an apparatus-side interface program of the apparatus.

(Item 10)

A program according to Item 8, in which the step of transmitting further includes transmitting the received positional information on the second object to other controllers excluding the one controller operated by the second user among the plurality of portable controllers.

(Item 11)

A program for causing processors of a plurality of portable controllers to execute a method of outputting a second generated image being two-dimensional to displays of the plurality of portable controllers, the plurality of portable controllers each being connected to an apparatus through a network, the method including the steps of:

receiving a two-dimensional game image, which is obtained by simplifying a three-dimensional game image of information on an application selected by a first user who operates the apparatus based on a first generated image within a three-dimensional virtual space that changes in association with a motion of a head of the first user wearing a head-mounted display, from the apparatus through the network, and further receiving positional information on a first object operated by the first user in the application being executed by the first user from the apparatus through the network; and generating and outputting an image, the step of generating and outputting an image including generating the two-dimensional game image obtained by simplifying the three-dimensional game image of the information on the application and the second generated image being two-dimensional, in which the simplified first object is arranged, based on the positional information on the first object, and outputting the two-dimensional game image and the second generated image to each of the displays of the plurality of portable controllers.

(Item 12)

A program according to Item 11, for causing the processor of one controller among the plurality of portable controllers to execute a method of outputting the second generated image to the display of the one controller, in which the step of generating and outputting the image further includes generating the second generated image being two-dimensional, in which the second object is arranged, based on the positional information on the second object operated by a second user who operates the one controller, and outputting the second generated image to the display of the one controller.

(Item 13)

A program according to Item 12, further including a step of transmitting the positional information on the second object operated by the second user who operates the one controller to the apparatus.

(Item 14)

A method of controlling an apparatus configured to output a first generated image within a three-dimensional virtual space to a head-mounted display, the apparatus being connected to a plurality of portable controllers through a network, the method including the steps of:

transmitting a two-dimensional game image, which is obtained by simplifying a three-dimensional game image of information on an application selected by the first user who operates the apparatus based on the first generated image within the three-dimensional virtual space that changes in association with a motion of a head of a first user wearing the head-mounted display, to the plurality of portable controllers through the network, and further transmitting positional information on a first object operated by the first user in the application being executed by the first user to the plurality of portable controllers through the network;

receiving positional information on a second object operated by a second user who operates one controller among the plurality of portable controllers from the one controller through the network based on the positional information on the first object and the two-dimensional game image obtained by simplifying the three-dimensional game image of the application; and generating and outputting an image, the step of generating and outputting an image including generating the first generated image within the three-dimensional virtual space, in which the first object and the second object are arranged, based on the positional information on the first object and the received positional information on the second object, and outputting the first generated image to the head-mounted display connected to the apparatus.

(Item 15)

Figure 5A:
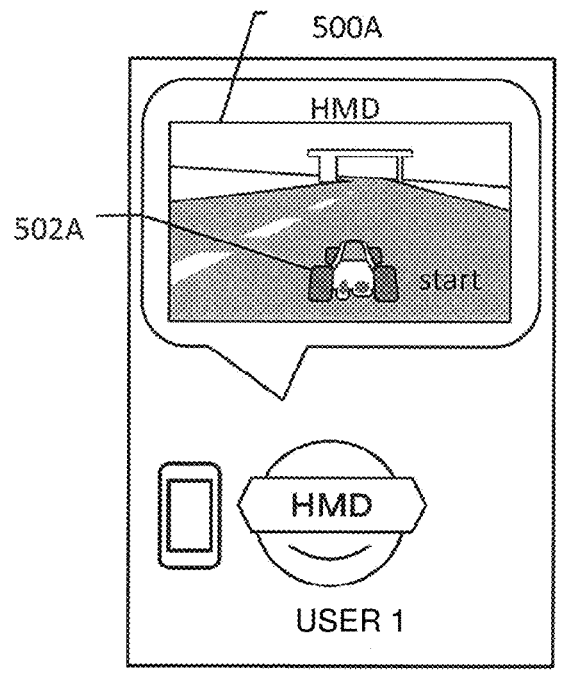
FIG. 5A is an illustration of a screen displayed on the HMD of the user 1 at start of the application according to at least one embodiment.

A system according to Item 7, in which the first generated image is generated based on a viewpoint different from a viewpoint of the second generated image. For example, the first generated image illustrated in FIG. 5A is generated based on the viewpoint different from the viewpoint of the second generated image illustrated in FIG. 5B.

(Item 16)

A program according to Item 11, in which the first generated image is generated based on a viewpoint different from a viewpoint of the second generated image.

Now, this embodiment is described. FIG. 1A is a system block diagram for illustrating a system according to at least one embodiment. In this system, an apparatus main unit 120 is connected to a first controller 100-1 held by a user 1 and a display 140. The display 140 may be a head-mounted display (HMD). The first controller 100-1 can be connected to a data communication network 160 on the Internet or an intranet via the apparatus main unit 120 to communicate to/from second to Nth controllers. The apparatus main unit 120 can manage communications conducted among a plurality of controllers. When the first controller and the second to Nth controllers are not within the same access point, that is, when the network 160 is an external network, for example, the Internet, the first controller 100-1 can communicate to/from the second to Nth controllers via the apparatus main unit 120 by a server (not shown) connected to the external network. Each of the second to Nth controllers is not directly connected to the apparatus main unit 120, and can be connected to the data communication network 160 to communicate to/from the apparatus main unit 120 of the first controller. Of the second to Nth controllers, a Kth controller is an operating controller with which a user K conducts an operation for an application being executed. A plurality of Kth controllers may be provided. The second to Nth controllers excluding the Kth controller are each an onlooking controller for looking on the operation conducted on the application between the Kth controller and the first controller. The first controller 100-1 to an Nth controller 100-N are referred to simply as "controller 100" unless specifically distinguished.

The first controller 100-1 and the apparatus main unit 120 are connected to each other through a wireless network, e.g., Wi-Fi or Bluetooth (trademark), and the apparatus main unit 120 and the head-mounted display 140 are connected to each other through a wired network or a wireless network, e.g., Wi-Fi or Bluetooth (trademark). When the network 160 is an external network, e.g., the Internet, the server (not shown) is connected to the network 160. The server is achieved by a known server computer mainly including a processor, different kinds of storage devices, and a data communication device, and is configured to transmit and receive data to/from the first to Nth controllers 100. The server can manage communications conducted among a plurality of controllers when the first controller and the second to Nth controllers are connected to each other through the external network, e.g., the Internet.

[Configuration of Controller]

Figure 1B:
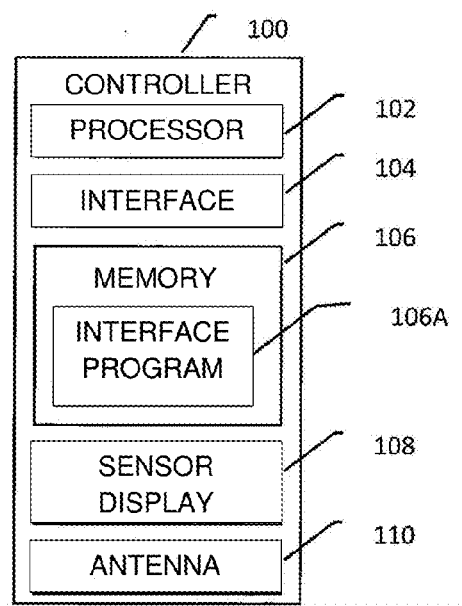
FIG. 1B is a block diagram for illustrating a controller 100 according to at least one embodiment.

FIG. 1B is a block diagram for illustrating the controller 100 according to at least one embodiment. The controller 100 can include at least one processor 102, at least one interface 104, at least one memory 106, at least one sensor display 108, and an antenna 110. The controller 100 can be achieved by, for example, a known smartphone or mobile terminal. The controller 100 is held or worn by the user himself or herself, and can detect different kinds of operation inputs each corresponding to an operation of the user, an action input of the user corresponding to a motion of the user, and voice input.

The controller-side processor 102 is configured to conduct different kinds of processing including execution of the controller-side interface program 106A and issuance of an instruction to each functional portion. The controller-side interface program 106A is configured to cause the functioning of a transmission portion 206 of the first controller, which is described later with reference to FIG. 2A, and a transmission portion 206, a reception portion 208, and an image generating and outputting portion 210 of each of the second to Nth controllers, which are described later with reference to FIG. 2B.

The controller-side interface program 106A is executed, to thereby be able to transmit and receive data between the apparatus main unit 120 and the controller 100. The interface program 106A on the first controller 100 can cause the transmission portion 206 described later to function to transmit output data from the controller 100-1 to the apparatus main unit 120. The interface programs 106A on the second to Nth controllers 100-2 to 100-N can cause the transmission portion 206 described later to function to transmit output data from the second to Nth controllers 100 to the apparatus main unit 120 through the network 160, further cause the reception portion 208 described later to function to receive different kinds of data from the apparatus main unit 120 through the network 160, and cause the image generating and outputting portion 210 described later to function to generate and output an application image in progress to the display 108 based on different kinds of information and the like received from the apparatus main unit 120.

The controller-side interface 104 is an interface configured to transmit the output data from the controller 100 to the apparatus main unit 120 and to receive data from the apparatus main unit 120, and is achieved by implementing the controller-side interface program 106A. More specifically, the controller-side interface 104 is an interface configured to transmit the output data including data obtained from different kinds of sensors built into the controller to the apparatus main unit and to receive different kinds of data transmitted by the apparatus main unit.

The controller-side memory 106 can store data obtained from different kinds of sensors, which is generated based on the operation of the user, the controller-side interface program 106A, and different kinds of data received by the controller 100.

The sensor display 108 is a touch sensor, and is configured to detect a swipe operation, pinch-in and pinch-out operations, and a tap operation conducted by the user.

The controller 100 includes the antenna 110, and the controller 100 itself has a function of communicating to/from the external network, e.g., the Internet. The controller 100 itself has the communicating function, and hence, for example, the second to Nth controllers 100 held by respective users 2 to N can transmit information relating to a Kth operation object to the apparatus main unit 120 through the network 160 based on the operation conducted by any one of the users 2 to N. Further, the controller 100 can download in advance the controller-side interface program 106A from the server onto the controller through the network, e.g., the Internet, via the antenna 110, and can install the controller-side interface program 106A onto the controller. By installing the controller-side interface program 106A onto the controller 100, the user can connect the controller and the apparatus main unit to each other through use of an arbitrary controller, for example, a smartphone, without the need to use a controller dedicated to the HMD, and can reflect the output data from the controller in display of the head-mounted device.

The controller 100 can further include a microphone configured to detect the voice input conducted by the user, an acceleration sensor and a gyro sensor that are configured to detect the action input conducted by the user, and a button, a key, a camera, a GPS, and a vibration device (not shown).

[Configuration of Apparatus Main Unit]

Figure 1C:
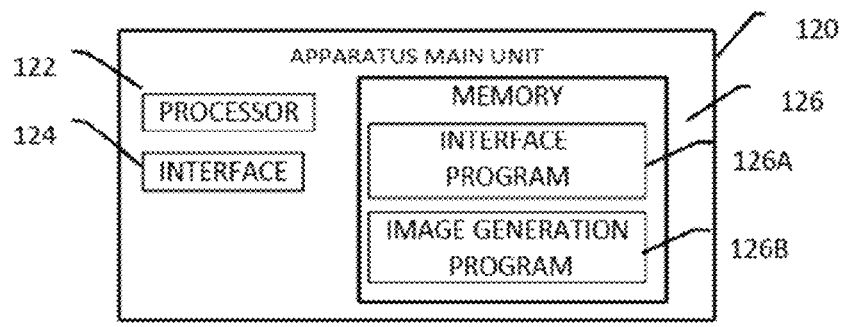
FIG. 1C is a block diagram for illustrating an apparatus main unit 120 according to at least one embodiment.

FIG. 1C is a block diagram for illustrating the apparatus main unit 120 according to at least one embodiment. The apparatus main unit 120 is connected between the first controller 100-1 and the display 140, and is further connected to the second to Nth controllers 100-2 to 100-N through the network. The apparatus main unit 120 is configured to transmit and receive data among those components. The apparatus main unit 120 can include at least one processor 122, at least one interface 124, and at least one memory 126. The apparatus main unit 120 can transmit and receive data to/from the second to Nth controllers through the network 160.

The apparatus main unit-side processor 122 is configured to conduct different kinds of processing including issuance of an instruction to each functional portion, execution of different kinds of applications, e.g., a game, execution of an apparatus main unit-side interface program 126A, and execution of an image generation program 126B for conducting image generating and outputting processing.

The apparatus main unit-side interface 124 is an input/output interface configured to receive the output data transmitted from the controller 100, to transmit predetermined data from the apparatus main unit 120 to the controller 100, and to output the generated image in which a display object is arranged to the HMD 140.

The apparatus main unit-side memory 126 stores the apparatus main unit-side interface program 126A, the image generation program 126B, and programs and data for achieving different kinds of functions to be executed by the processor of the apparatus main unit. The apparatus main unit can be achieved by a known personal computer, a known game apparatus main unit, or the like by having the apparatus main unit-side interface program 126A and the image generation program 126B installed thereon.

The apparatus main unit-side interface program 126A is configured to cause the functioning of an input detection portion 302, a transmission portion 304, a reception portion 306, and an identifying portion 308 that are described later with reference to FIG. 3. By executing the apparatus main unit-side interface program 126A, the apparatus main unit 120 detects and receives the data transmitted from the first to Nth controllers 100-1 to 100-N, and transmits different kinds of data from the apparatus main unit 120 to the first to Nth controllers 100. The apparatus main unit-side interface program 126A is installed on the apparatus main unit in advance. For example, the apparatus main unit-side interface program 126A can be installed through use of a recording medium or by being downloaded in advance through the network, e.g., the Internet or the intranet, which is connected to the apparatus main unit. The apparatus main unit-side interface program 126A is installed, and the controller-side interface program 106A described later is installed on the controller. Hence, the user can reflect a user input or the like from the controller 100 in the HMD, and can transmit the display on the HMD and the information on the application being operated to the controller through use of an arbitrary controller, for example, the mobile terminal or a smartphone without the need to use the controller dedicated to the apparatus main unit.

The image generation program 126B is configured to cause the functioning of an image generating and outputting portion 310 described later.

The display 140 is connected to the apparatus main unit 120, and is configured to display the generated image output from the apparatus main unit 120. The display 140 may be an HMD.

[Functional Configuration of Controller]

Figure 2A:
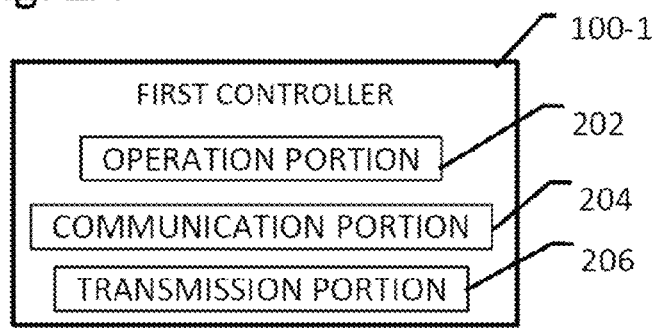
FIG. 2A is a functional block diagram for illustrating a controller 100-1 according to at least one embodiment.
Figure 2B:
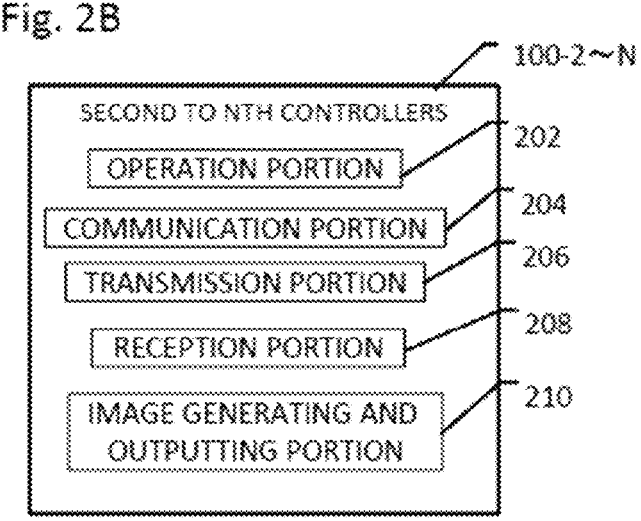
FIG. 2B is a functional block diagram for illustrating controllers 100-2 to 100-N according to at least one embodiment.

FIG. 2A is a diagram for illustrating a functional configuration of the first controller 100-1 connected to the apparatus main unit, and FIG. 2B is a diagram for illustrating a functional configuration of each of the second to Nth controllers 100-2 to 100-N that are connected to the apparatus main unit through the network. As illustrated in FIG. 2A and FIG. 2B, the first controller 100-1 can include an operation portion 202, a communication portion 204, and the transmission portion 206. The second to Nth controllers 100 can include the reception portion 208 and the image generating and outputting portion 210 in addition to the operation portion 202, the communication portion 204, and the transmission portion 206. Those functions are achieved by causing the processor 102 to execute predetermined programs stored in the memory 106 of the controller 100. The transmission portion 206, the reception portion 208, and the image generating and outputting portion 210 of the controller 100 can be achieved by causing the controller-side processor to execute the controller-side interface program 106A. The interface program 106A is downloaded in advance from the server 160 through the Internet via the antenna 110 of the controller, and is installed on the controller 100.

The operation portion 202 acquires an input relating to a predetermined operation conducted for the controller 100 by the user from different kinds of sensors provided to the controller. The different kinds of sensors represent a display sensor, an acceleration sensor, a gyro sensor, and the like. When the user moves the controller, the operation portion acquires an acceleration and an angular velocity corresponding to a motion of the controller from the acceleration sensor and the gyro sensor as the output data. When the user conducts a swipe operation, pinch-in and pinch-out operations, and a tap operation for a sensor display of the controller, the operation portion 202 acquires types of those operations and/or different kinds of data relating to those operations, for example, a tap on the display, from the sensor display as the output data. The operation portion 202 consecutively stores those pieces of information (acceleration, angular velocity, and operation input information) in the memory 106.

The communication portion 204 is configured to download various kinds of data, for example, the interface program 106A, from the server through the Internet, and to allow the second to Nth controllers, which are not directly connected to the apparatus main unit, to communicate to/from the apparatus main unit 120 through external and internal networks. By including the communication portion 204, the controller 100 can install and update the controller-side interface program 106A at an arbitrary place as long as there is an environment providing available Internet connection even when the controller 100 is not directly connected to the apparatus main unit 120. In addition, the second to Nth controllers 100-2 to 100-N can communicate to/from the apparatus main unit 120 through the network.

The transmission portion 206 transmits the information (acceleration, angular velocity, and operation input information) stored in the memory by the operation portion 202 to the input detection portion 302 of the apparatus main unit as the output data in response to a request received from the apparatus main unit 120.

Figure 13:
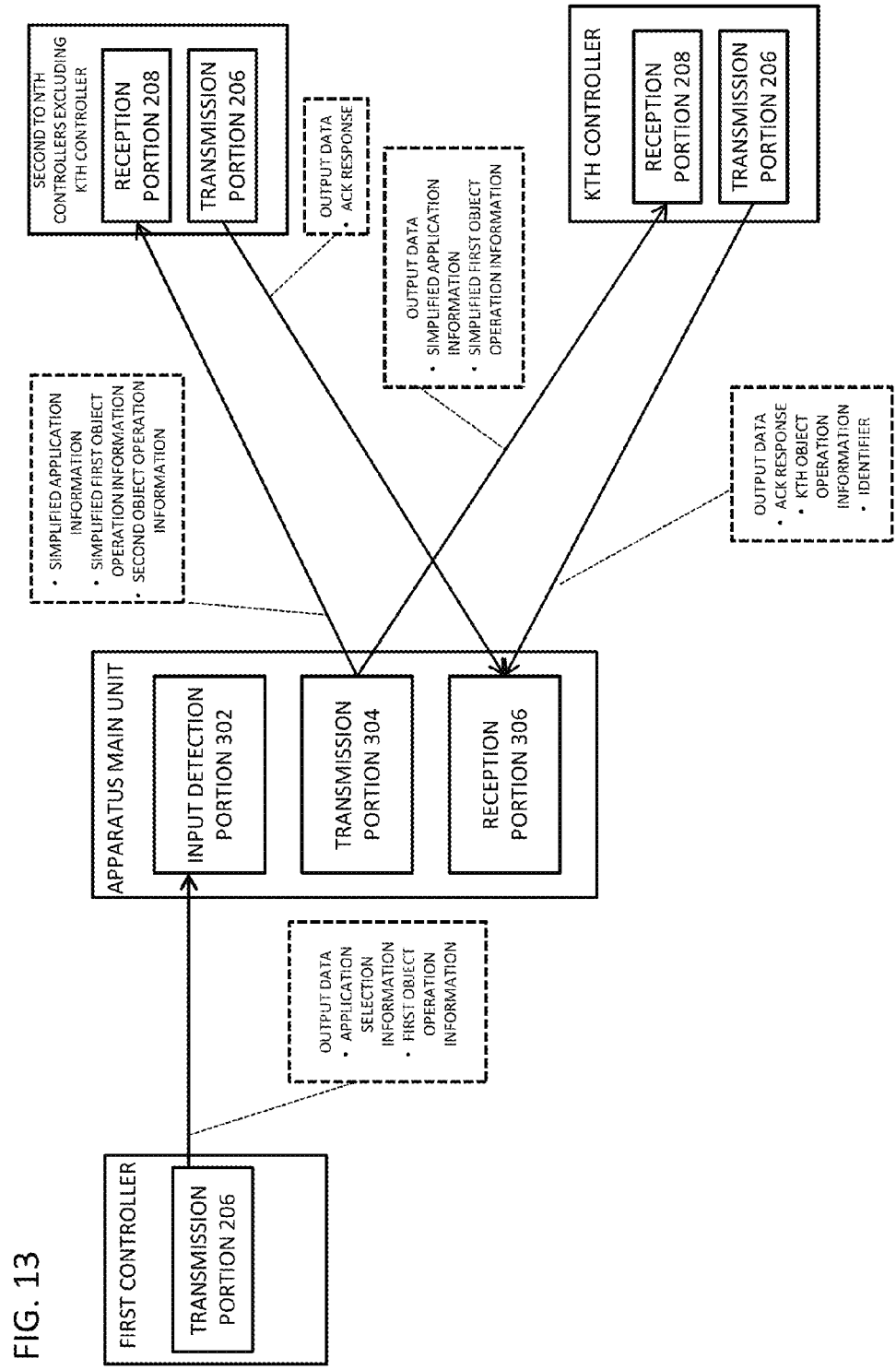
FIG. 13 is a diagram for illustrating how data is exchanged among the first controller, the apparatus main unit, the second to Nth controllers, and the Kth controller according to at least one embodiment.

More specifically, as illustrated in FIG. 13, on the first controller 100-1, the output data can include selection information on the application selected by the user 1 and operation information on an operation object operated by the user 1 through the first controller. Further, on the second to Nth controllers 100-2 to 100-N excluding the Kth controller, the output data can include ACK information for informing that the selection information on the application transmitted from the apparatus main unit 120 has been received. In addition, on the Kth controller 100-K, the output data can include ACK information for informing that the selection information on the application transmitted from the apparatus main unit 120, operation information for the operation object operated by the user K, and an identifier of the Kth controller.

The second to Nth controllers 100 can further include the reception portion 208 configured to receive information transmitted from the apparatus main unit 120. More specifically, as illustrated in FIG. 13, the reception portions 208 of the second to Nth controllers 100 can receive simplified information, for example, course information, relating to the application selected by the user 1, a simplified course image, information obtained by simplifying the operation information relating to the operation object being operated by the user 1, information relating to the application being operated, and the like. The information obtained by simplifying the operation information relating to the operation object being operated by the user 1 represents, for example, positional information on the operation object being operated by the user 1 on a course in a racing game.

The second to Nth controllers 100 can further include the image generating and outputting portion 210. The image generating and outputting portion 210 can generate the simplified course image in which the operation objects are arranged based on the course information and the simplified course image received from the apparatus main unit 120 by the reception portion 208 of the controller, the positional information on the operation object being operated by the user 1 through use of the operating controller 100-1, and the positional information on the operation object being operated by the user K through use of the operating controller 100-K received from the apparatus main unit, and can output the simplified course image onto the sensor display.

On the Kth operating controller 100-K, the image generating and outputting portion 210 can generate an image in which the operation object is arranged based on information relating to the operation object being operated by the user K, and can output the image onto the display.

[Functional Configuration of Apparatus Main Unit]

Figure 3:
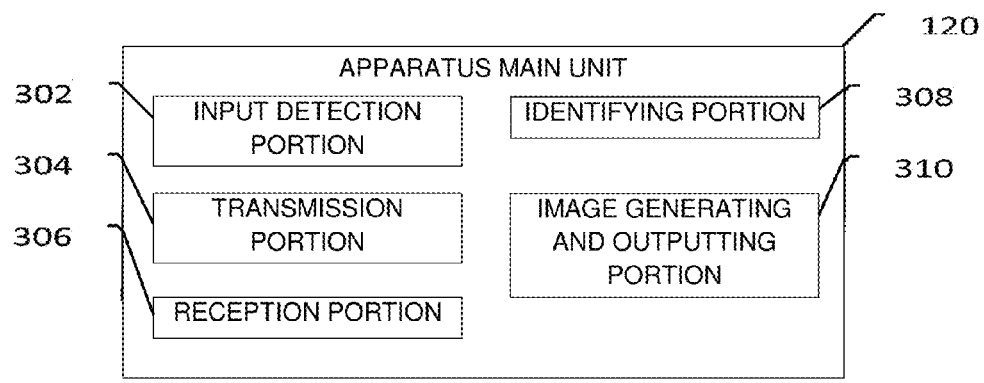
FIG. 3 is a functional block diagram for illustrating the apparatus main unit 120 according to at least one embodiment.

FIG. 3 is a diagram for illustrating a functional configuration of the apparatus main unit 120. As illustrated in FIG. 3, the apparatus main unit 120 includes the input detection portion 302, the transmission portion 304, the reception portion 306, the identifying portion 308, and the image generating and outputting portion 310. Those functions are achieved by causing the processor to execute predetermined programs stored in the memory of the apparatus main unit.

The input detection portion 302 is configured to detect and acquire various kinds of output data stored in the memory of the controller 100 and transmitted from the transmission portions 206 of the first to Nth controllers 100. More specifically, on the first controller 100-1, the output data includes the selection information on the application selected by the user 1 and the operation information for the operation object operated by the user 1 through the first controller. When the detected output data is the selection information on the application selected by the user 1, the input detection portion 302 outputs the selection information to the transmission portion 304. When the detected output data is the operation information for the operation object operated by the user 1 through the first controller, the input detection portion 302 outputs the selection information and the operation information to the transmission portion 304 and the image generating and outputting portion 310 of the apparatus main unit.

The transmission portion 304 is configured to transmit, to the second to Nth controllers, the information obtained by simplifying the information relating to the application generated based on the application selection information acquired from the input detection portion 302 and the operation information relating to the operation object, which is obtained by simplifying the operation conducted by the user 1 through the first controller.

Figure 5B:
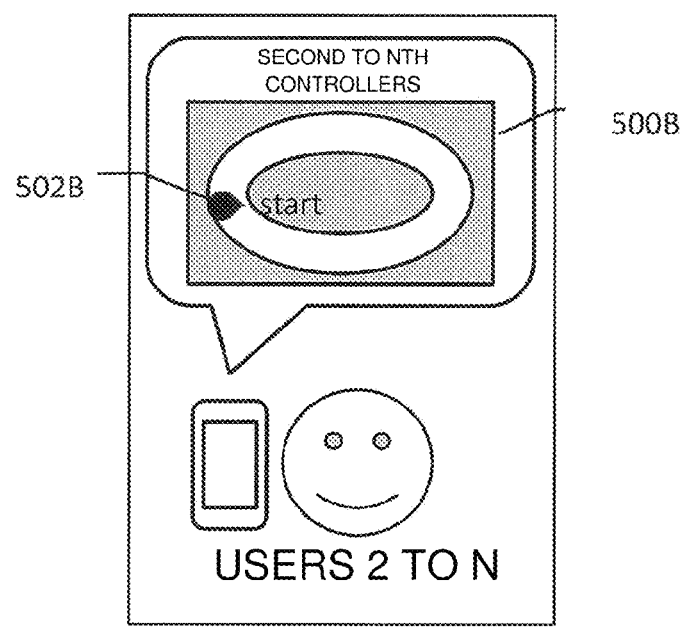
FIG. 5B is an illustration of a screen displayed on displays of the controllers 100-2 to N at the start of the application according to at least one embodiment.

When receiving an ACK response from the second to Nth controllers, the apparatus main unit 120 starts execution of the application selected by the user 1. The information relating to the application being executed on the apparatus main unit includes, for example, a three-dimensional image displayed on the HMD. In general, the three-dimensional image has an extremely large data size. In particular, a range that can be displayed on the HMD to allow the user to immerse himself or herself in a virtual space needs to be changed depending on the motion of the head of the user, and hence the information relating to the application being executed on the apparatus main unit virtually includes an image having a display angle wider than that of the screen displayed on the display, which is visible to the user 1. In this case, the size of data operated by the user 1 is large, and hence, when the information relating to the application in progress is transmitted to the second to Nth controllers as it is, a communication failure may occur in the second to Nth controllers with a small network line capacity or a small controller reception capacity. In this embodiment, the transmission portion 304 transmits the application information obtained by simplifying the information on the application being operated by the user 1 to the second to Nth controllers held by the users 2 to N through the network 160. The simplified application information represents, for example, an image obtained by converting the image displayed on the HMD into a smaller data size and information on a course number selected by the user 1. The simplified operation information relating to the operation object represents the positional information on the operation object operated by the user 1. For example, as illustrated in FIG. 5A, the image displayed on the HMD is a three-dimensional image 500A, and the object operated by the user 1 is a racing car 502A. Meanwhile, as illustrated in FIG. 5B, an image 500B displayed on the displays of the second to Nth controllers includes a simplified two-dimensional course image and an operation object image 502B indicated by the black circle.

In addition, when the reception portion 306 described later receives the information relating to the object operated by the user K through the Kth controller and the identifier of the Kth controller, the transmission portion 304 can transmit the information relating to the Kth object to the second to Nth controllers excluding the Kth controller through the network.

The reception portion 306 is configured to receive the output data transmitted by the transmission portions 206 of the second to Nth controllers. For example, the reception portion 306 receives, from the second to Nth controllers, the ACK information indicating that each of the second to Nth controllers 2 to N has received the simplified application information transmitted from the apparatus main unit 120. Further, on the Kth controller, the reception portion 306 receives the information relating to the object operated by the user K and the identifier of a controller K from the Kth controller.

The identifying portion 308 is configured to identify the controllers (second to Nth controllers) that have joined the application being executed on the controller of the first controller 100-1, and to individually assign identifiers to the controllers. By individually assigning the identifiers to the controllers, it is possible to identify the Kth operating controller being used by the user K for operating the Kth object while the application is executed by the user 1.

The image generating and outputting portion 310 is configured to conduct an arithmetic operation for display of the operation object to be displayed on the display based on the information relating to the operation object operated by the user 1, the information relating to the operation object operated by a Kth user, and the identifier of the controller K, and to generate an image of the display object. The information relating to the operation object operated by the user 1 includes an acceleration, an angular velocity, a displacement amount, a displacement velocity, and a direction that are exhibited when the operation object is moved. The information relating to the operation object operated by the Kth user represents, for example, the positional information on the simplified course relating to the operation object. When a so-called three-dimensional image is to be generated, display parameters including data of respective vertices (color data and positional coordinates within a world coordinate system of vertices) of the operation object operated by the user are arithmetically operated, and the image of the display object is sequentially generated frame by frame based on the arithmetically operated display parameters. Subsequently, the image generating and outputting portion 310 generates an image in which the arithmetically operated display object is arranged frame by frame on the screen displayed on the display of the active head-mounted device, and outputs the image to the HMD. The HMD displays the image output from the image generating and outputting portion 310.

Figure 4:
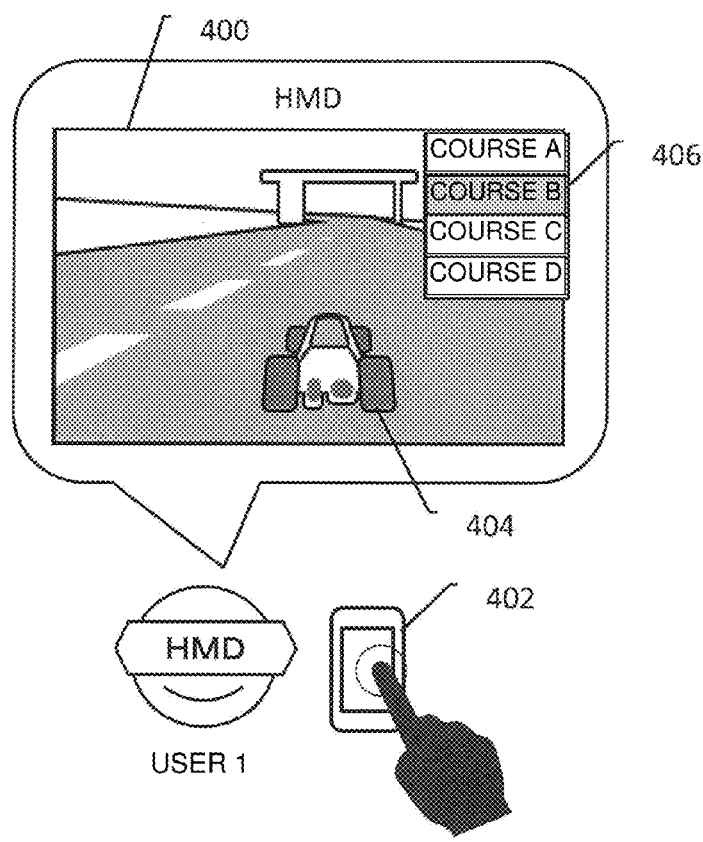
FIG. 4 is an illustration of a screen displayed on an HMD after being generated based on a selection operation conducted for an application by a user 1 according to at least one embodiment.

FIG. 4 is an illustration of a screen displayed on the HMD generated based on a selection operation conducted by the user 1 according to at least one embodiment. A screen 400 is an image displayed on the HMD after being generated based on the selection operation for the application conducted by the user 1. In FIG. 4, the user 1 conducts a touch input for the sensor display of the first controller through use of a first controller 402, and conducts the selection operation for a course menu of the racing game while viewing the display screen on the HMD, to thereby select a course B (406). When the course is selected by the user 1, the selection information on the application is transmitted from the transmission portion 206 of the first controller to the input detection portion 302 of the apparatus main unit as the output data.

FIG. 5 are illustrations of the screen 500A displayed on the HMD of the user 1 at the start of the application and the screen 500B displayed on the controllers of the users 2 to N at the start of the application according to at least one embodiment. A detailed image of the operation object (racing car 502A in FIG. 5A) operated by the user 1 and a three-dimensional course image are displayed on the screen displayed on the HMD of the user 1. Meanwhile, an icon (black circle 502B in FIG. 5B) obtained by simplifying the operation object operated by the user 1 and the simplified two-dimensional course image are displayed on the screen displayed on the displays of the users 2 to N. This is because, when an image having a large data size, which is operated by the user 1, is transmitted to the second to Nth controllers through the network as it is, a communication failure may occur between the second to Nth controllers and the apparatus main unit depending on the network line capacity or a communication speed of the controller. Therefore, in this embodiment, the transmission portion 304 of the apparatus main unit transmits information obtained by simplifying the information on the application being operated by the user 1.

Figure 6A:
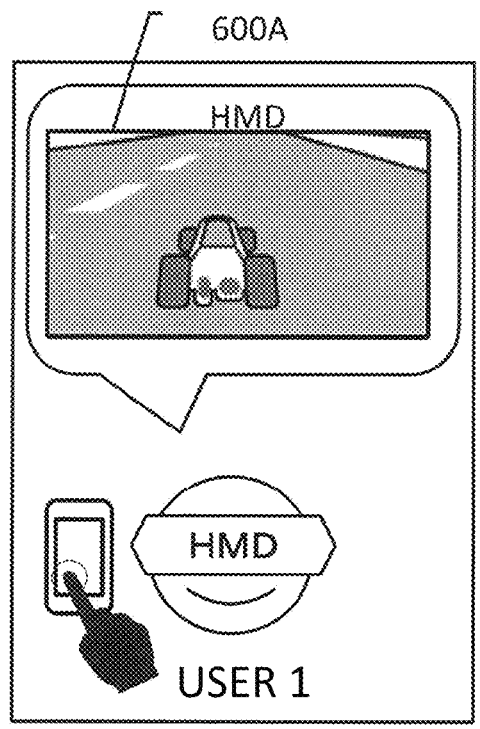
FIG. 6A is an illustration of a screen displayed on the HMD of the user 1 during execution of the application according to at least one embodiment.
Figure 6B:
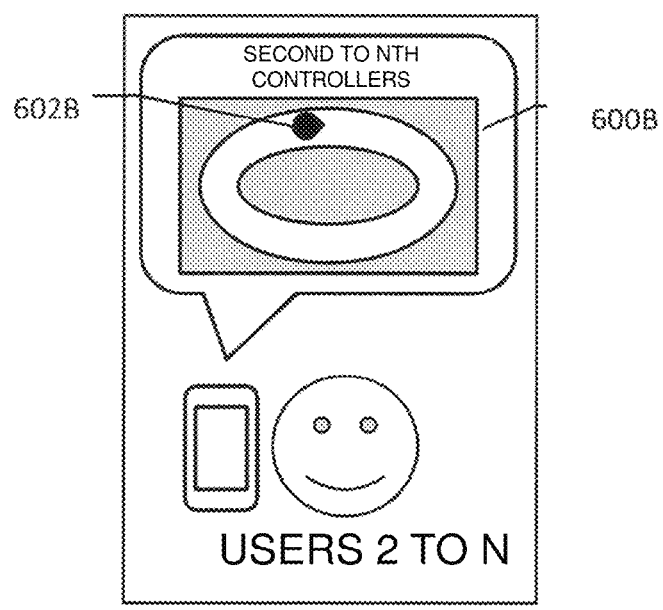
FIG. 6B is an illustration of a screen displayed on the displays of the second to Nth controllers during the execution of at least application according to the one embodiment.

FIG. 6 are illustrations of a screen 600A displayed on the HMD of the user 1 during the execution of the application operated by the user 1 and a screen 600B displayed on the controllers of the users 2 to N during the execution of the application according to at least one embodiment. The screen displayed on the HMD of the user 1 during the execution of the application is updated to be displayed based on the operation conducted for the first controller 100 by the user 1. In the same manner, the screen displayed on the displays of the users 2 to N during the execution of the application is updated to be displayed based on the operation conducted for the first controller 100 by the user 1. For example, in FIG. 5A, the racing car being operated by the user 1 is updated to be displayed on the HMD, and in FIG. 5B, the racing car being operated by the user 1 is updated to be displayed on the displays of the second to Nth controllers. The icon 502B displayed in the left part of the screen 500B in FIG. 5B is always updated to be displayed while moving within the course based on the operation conducted by the user 1, and is displayed in the upper part of a screen 600B in FIG. 6B (icon 602B).

Figure 7A:
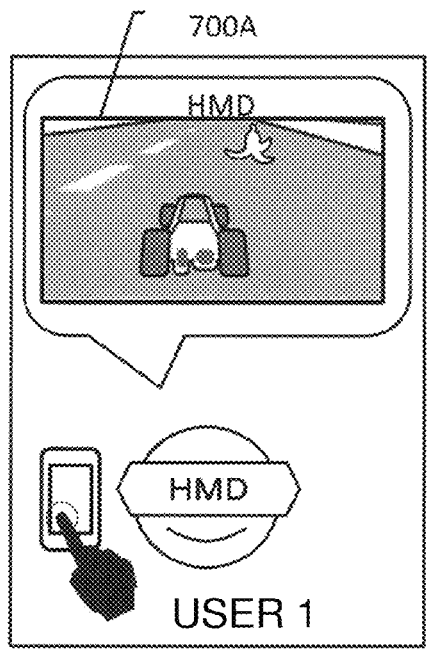
FIG. 7A is an illustration of a screen displayed on the HMD of the user 1 during execution of the application according to at least one embodiment.

FIG. 7 are illustrations of a screen 700A displayed on the HMD of the user 1 during the execution of the application, a screen 700B displayed on the display of the Kth controller operated by the user K during the execution of the application, and a screen 700C displayed on the displays of the second to Nth controllers excluding the Kth controller during the operation of the application according to at least one embodiment. The user 1 operates the operation object that can be operated by the user 1 (racing car in this embodiment) on the display of the first controller as illustrated in FIG. 7A. The operation object relating to an operation for the display of the first controller by the user 1 is updated to be displayed on the HMD of the user 1 (700A) and on the displays of the second to Nth controllers (700B and 700C).

Figure 7B:
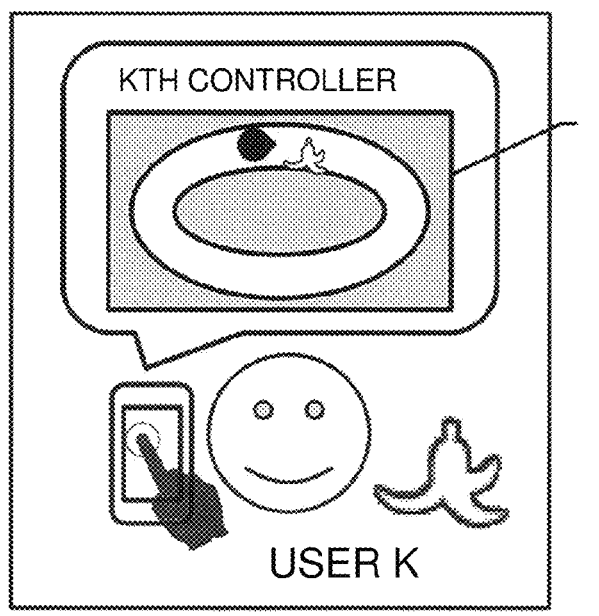
FIG. 7B is an illustration of a screen displayed on the display of the Kth controller during the execution of the application according to at least one embodiment.
Figure 7C:
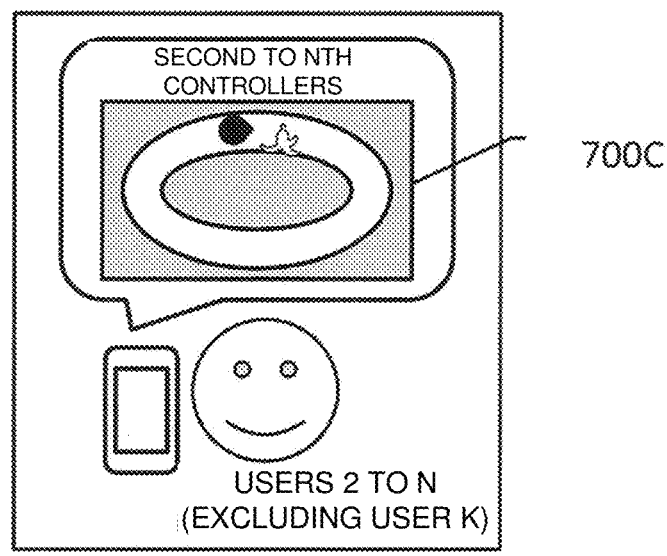
FIG. 7C is an illustration of a screen displayed on the displays of the second to Nth controllers (excluding the Kth controller) during the execution of the application according to at least one embodiment.

In this case, the user K operates an object (banana in this embodiment) that can be operated by the user K on the display of the Kth controller to arrange the object in a predetermined position on the course as illustrated in FIG. 7B. The operation (arrangement of the banana on the course in this embodiment) conducted for the display of the Kth controller by the user K is updated to be displayed on the HMD of the user 1 (banana displayed within 700A in FIG. 7A) and on the display of the second to Nth controllers (banana arranged on the simplified course displayed within 700B in FIG. 7B and 700C in FIG. 7C). When there are a plurality of users K, a plurality of objects are updated to be displayed on the display of each user. The users 2 to N excluding the user K have joined the application started by the user 1, but are looking on the operation conducted between the user 1 and the user K on the displays of the controllers without conducting an operation for the application.

Figure 8A:
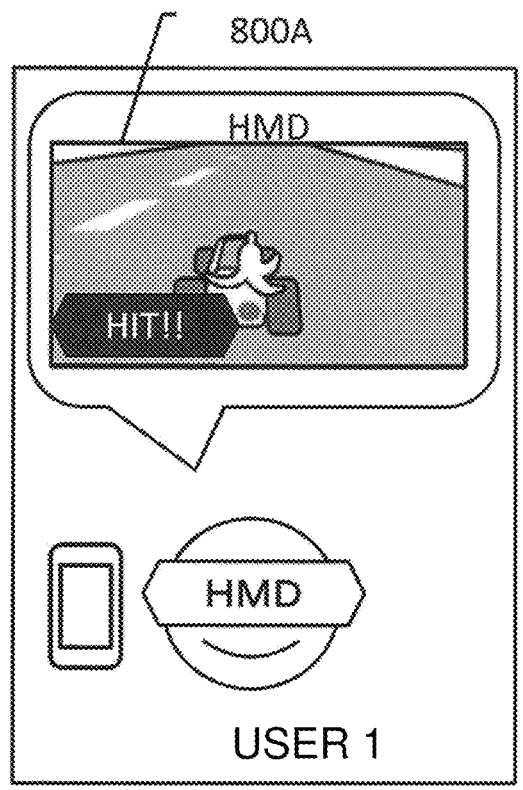
FIG. 8A is an illustration of a screen displayed on the HMD of the user 1 during execution of the application according to at least one embodiment.
Figure 8B:
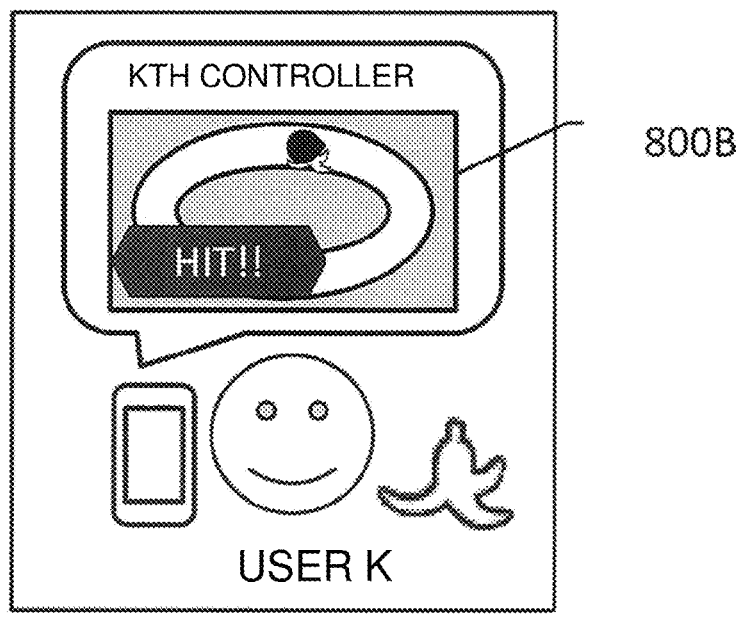
FIG. 8B is an illustration of a screen displayed on the display of the Kth controller during the execution of the application according to at least one embodiment.
Figure 8C:
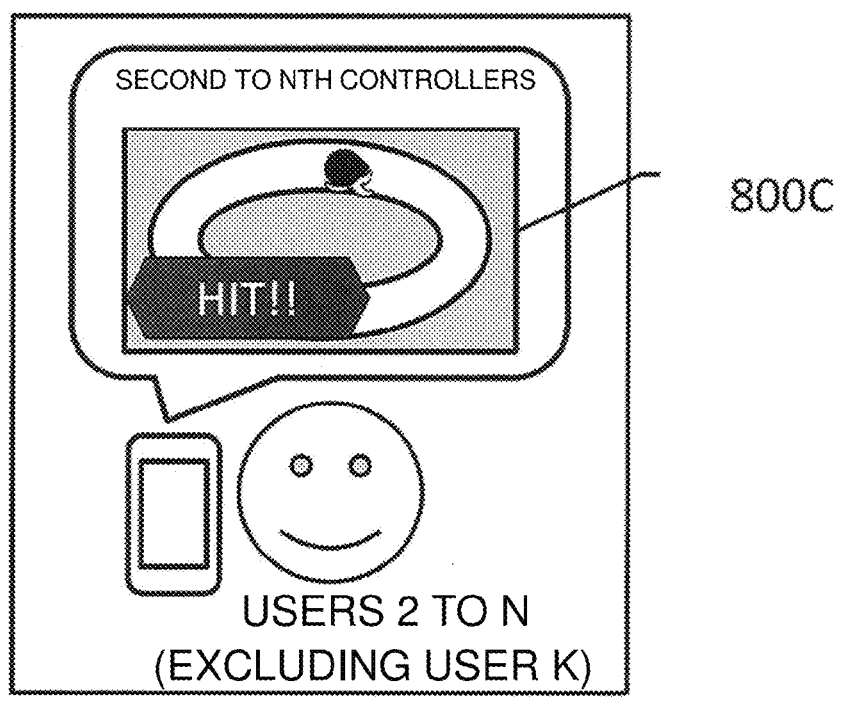
FIG. 8C is an illustration of a screen displayed on the displays of the second to Nth controllers (excluding the Kth controller) during the execution of the application according to at least one embodiment.

FIG. 8 are illustrations of a screen 800A displayed on the HMD of the user 1 during the execution of the application, a screen 800B displayed on the display of the controller of the user K during the execution of the application, and a screen 800C displayed on the displays of the second to Nth controllers (excluding the Kth controller) during the operation of the application according to at least one embodiment. In this embodiment, with a trigger that the operation object (racing car) operated by the user 1 has overlapped the operation object (banana) operated by the user K within the virtual space, the characters "HIT!!" is displayed on the display of the HMD of the user 1 (800A in FIG. 8A), on the display of the controller of the user K (800B in FIG. 8B), and on the displays of the second to Nth controllers excluding the user K (800C in FIG. 8C).

Figure 9:
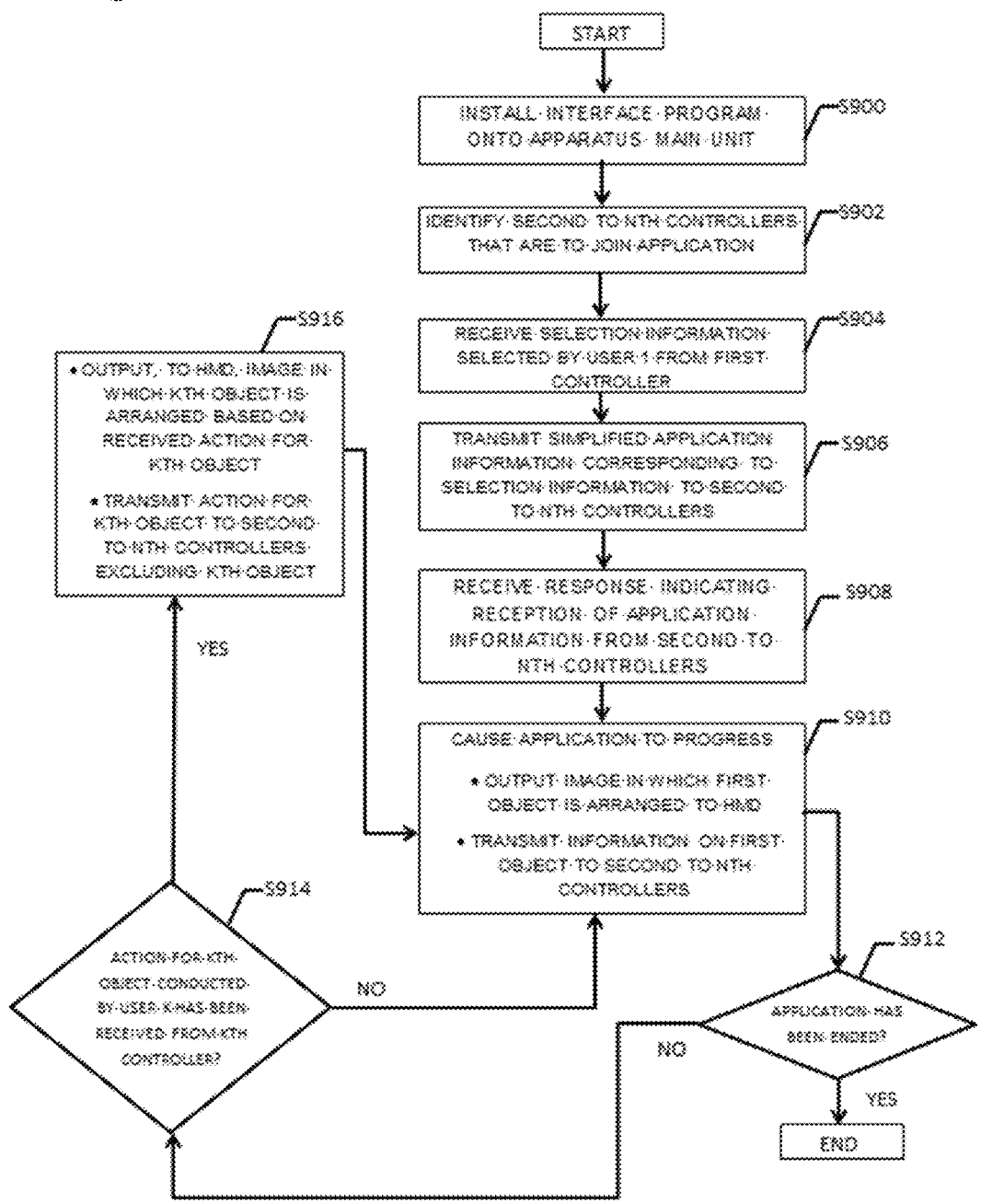
FIG. 9 is a flowchart for illustrating a flow of processing conducted by the apparatus main unit according to at least one embodiment.

FIG. 9 is a flowchart for illustrating a flow of processing conducted by the apparatus main unit 120. First, the apparatus main unit acquires the interface program. 126A (Step 900). Then, the user 1 uses the controller 1 to activate an application, in this embodiment, a racing game, while viewing the HMD.

Subsequently, the identifying portion 308 identifies the second to Nth controllers that are to join the application activated by the user 1 through the network, and assigns individual identifiers to the identified controllers (Step 902).

Subsequently, the input detection portion 302 receives and detects the selection information, in this embodiment, the course selection information, relating to the application selected by the user 1, which has been transmitted from the first controller 100-1 (Step 904).

Subsequently, the transmission portion 304 transmits, to the second to Nth controllers, the information obtained by simplifying the information on the application corresponding to the application selection information selected by the user 1, which has been detected by the input detection portion 302 (Step 906). That is, in this embodiment, the transmission portion 304 transmits the course number of the racing game selected by the user 1, the simplified course image corresponding to the selected course number, and the like.

Subsequently, the reception portion 306 receives, from the second to Nth controllers, the ACK response informing that the information obtained by simplifying the information on the application has been received (Step 908).

When the reception portion 306 receives the ACK response, the apparatus main unit starts the application, in this embodiment, the racing game based on the selected course B (Step 910). During the progress of the application, the input detection portion 302 consecutively receives, from the first controller 100-1, the operation information for the operation object operated by the user land different kinds of input information relating to a predetermined operation conducted by the user 1. Then, the image generating and outputting portion 310 conducts an arithmetic operation for the display of the display object based on the operation information received from the input detection portion 302, and generates the image of the display object, to thereby generate and output the image in which the generated display object is arranged frame by frame on the screen displayed on the display of the activated head-mounted device (Step 910). Further, the transmission portion 304 transmits, to the second to Nth controllers, the information on the operation object operated by the user 1 on the virtual space, in this embodiment, the positional information on the racing car operated by the user 1 on the course (Step 910).

The apparatus main unit determines whether or not the application has been ended by the user 1 (Step 912). When the application has not been ended, the reception portion 306 determines whether or not the operation information for the operation object operated through one controller (Kth controller) among the second to Nth controllers that have joined the application has been received from the one controller, in this embodiment, whether or not the positional information on the banana arranged on the course by the user K and the identifier of the Kth controller have been received from the one controller (Step 914).

Subsequently, the image generating and outputting portion 310 conducts an arithmetic operation for the display of the Kth object based on the received operation information for the Kth object, and generates the image on the virtual space, in which the Kth object is arranged, frame by frame, to thereby output the image to the HMD (Step 916). Further, the transmission portion 304 transmits, to the second to Nth controllers excluding the Kth controller, the operation information for the Kth object, in this embodiment, the positional information on the banana arranged on the course by the user K (Step 916).

The processing of from Step 910 to Step 916 is repeated until the application is ended by the user.

Figure 10:
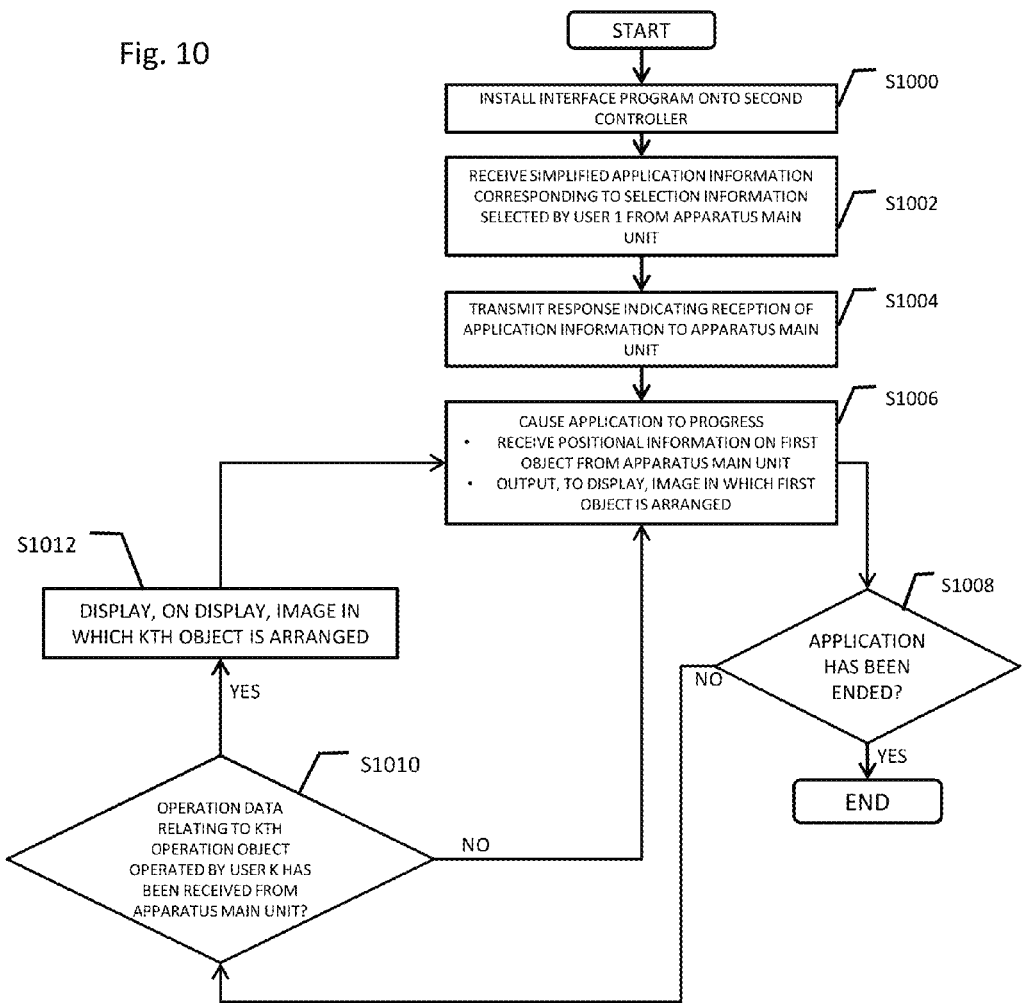
FIG. 10 is a flowchart for illustrating a flow of processing conducted by the Kth controller according to at least one embodiment.

FIG. 10 is a flowchart for illustrating a flow of processing conducted by the second to Nth controllers 100 excluding the Kth controller. The second to Nth controllers 100 excluding the Kth controller are onlooking controllers that join the application activated by the user 1 but do not conduct an operation for the object.

First, the interface program 106A is downloaded and installed onto the controller 100 through the Internet via the antenna 110 provided to the controller 100 (Step 1000).

Subsequently, the reception portion 208 receives, from the apparatus main unit, the information obtained by simplifying the information on the application corresponding to the application selection information selected by the user 1 (Step 1002).

Subsequently, the transmission portion 206 transmits, to the apparatus main unit, the ACK response informing that the simplified application information has been received (Step 1004).

When the apparatus main unit receives the ACK response, the apparatus main unit starts the execution of the application. Then, the reception portion 208 of the controller receives, from the apparatus main unit, the information obtained by simplifying the operation information relating to the operation object being operated by the user 1, in this embodiment, the positional information on the racing car on the course (Step 1006). Then, the image generating and outputting portion 210 arranges the first object in the image of the simplified application information based on the received information obtained by simplifying the information relating to the first object, and outputs the image to the display of the controller (Step 1006).

The reception portion 208 determines whether or not information indicating that the application has been ended by the user 1 has been received from the apparatus main unit (Step 1008). When the application has not been ended, the reception portion 208 further determines whether or not the operation information for the Kth operation object operated by the user K has been received from the transmission portion 304 of the apparatus main unit (Step 1010).

When the operation information for the Kth operation object operated by the user K is received, the image generating and outputting portion 210 generates the image in which the Kth object is arranged, and outputs the image to the display of the controller (Step 1012).

The processing of from Step 1006 to Step 1012 is repeated until the application is ended by the user.

Figure 11:
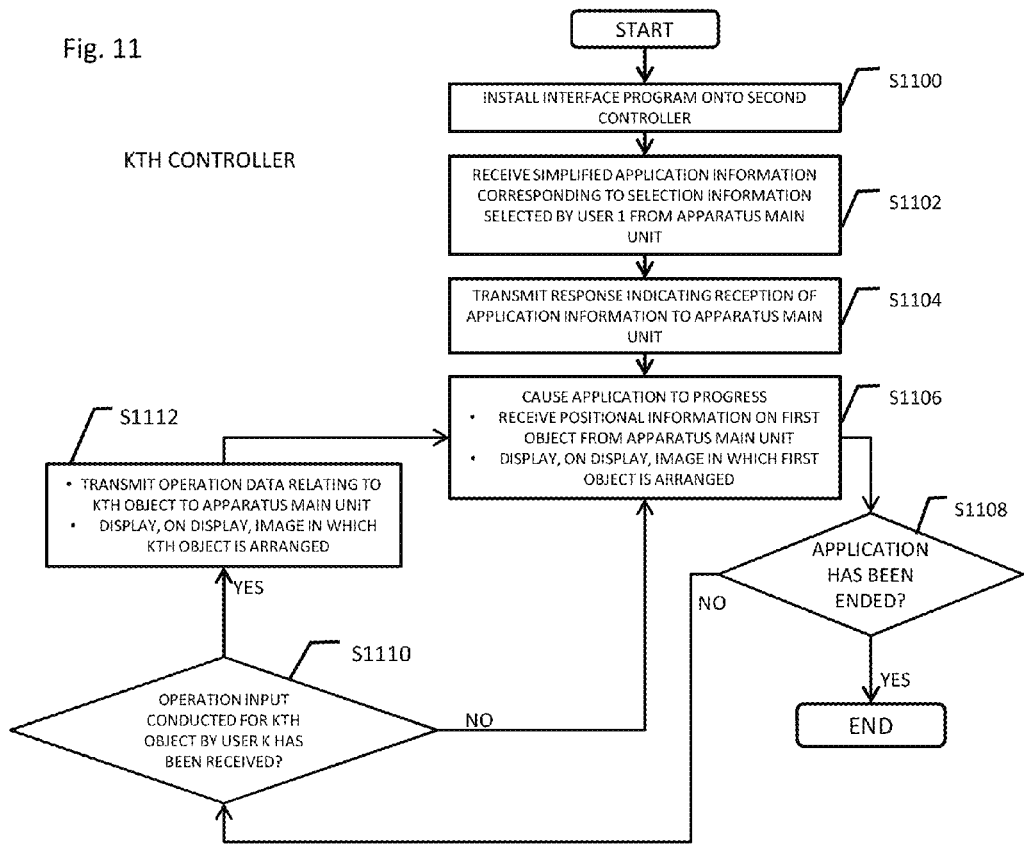
FIG. 11 is a flowchart for illustrating a flow of processing conducted by the second to Nth controllers (excluding the Kth controller) according to at least one embodiment.

FIG. 11 is a flowchart for illustrating a flow of processing conducted by the Kth controller. The Kth controller 100-K is an operating controller that joins the application activated by the user 1 and conducts an operation for the Kth object on the application.

The processing of from Step 1100 to Step 1108 is the same as the processing of from Step 1000 to Step 1008 illustrated in FIG. 10, and hence a description thereof is omitted.

When the application has not been ended by the user 1, the operation portion 202 determines whether or not a user operation for the Kth operation object operated by the user K, which is requested depending on the content of the application being executed, has been acquired (Step 1110). In this case, the user operation for the Kth operation object operated by the user K, which is requested depending on the content of the application being executed, represents, in this embodiment, the operation for arranging a banana on the simplified course.

When the operation information for the Kth operation object operated by the user K is received, the image generating and outputting portion 210 generates the image in which the Kth object is arranged, and outputs the image to the display of the Kth controller (Step 1112). Further, the transmission portion 206 transmits, to the reception portion 306 of the apparatus main unit, the operation information for the Kth object corresponding to the user operation, in this embodiment, the positional information on the banana arranged on the course (Step 1112).

The processing of from Step 1106 to Step 1112 is repeated until the application is ended by the user.

Figure 12:
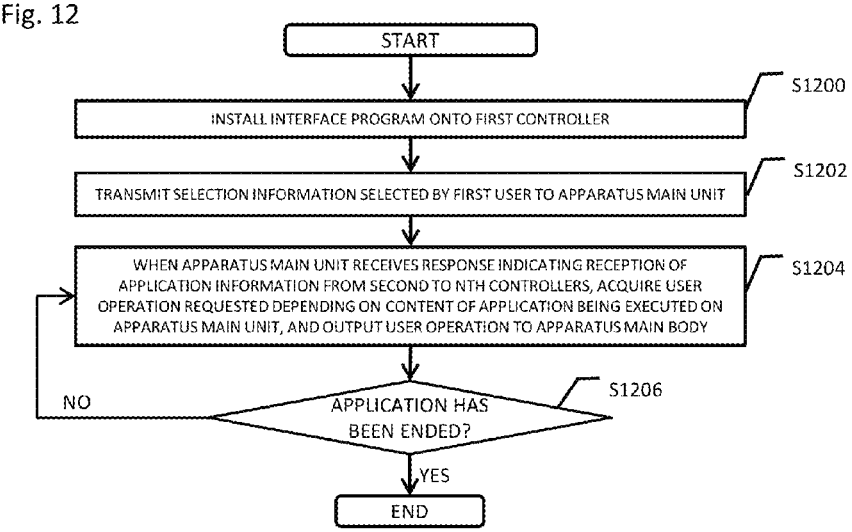
FIG. 12 is a flowchart for illustrating a flow of processing conducted by a first controller according to at least one embodiment.

FIG. 12 is a flowchart for illustrating a flow of processing conducted by the first controller. The first controller 100-1 is an operating controller that joins the application activated by the user 1 and conducts an operation for the first object on the application. The user 1 wears the HMD to immerse himself or herself in the virtual space. Therefore, the image visible to the user is the image displayed on the HMD, and hence the sensor display of the first controller 100-1 is dedicated to use for the operation conducted by the user 1.

First, the interface program 106A is downloaded and installed onto the controller 100 through the Internet via the antenna 110 provided to the controller 100 (Step 1200).

Subsequently, the transmission portion 206 transmits, to the input detection portion 302 of the apparatus main unit, the selection information relating to the application selected by the first user, in this embodiment, the selected course information (Step 1202). When the ACK response indicating the reception of the application information is received from the second to Nth controllers, the application is started on the apparatus main unit.

Subsequently, the operation portion 202 acquires the operation information relating to the first object operated by the user 1, which is requested depending on the content of the application being executed on the apparatus main unit. In this embodiment, the application being executed is the racing game, and the user operation requested depending on the content of the application being executed represents an operation for tilting the controller, an operation for controlling a traveling direction of the racing car through use of the sensor display of the controller, or the like. Then, the transmission portion 206 outputs the operation information relating to the first object to the apparatus main unit (Step 1204). In this embodiment, the operation information relating to the first object represents different kinds of operation input information relating to predetermined operations conducted by the user 1, and includes action input information from the acceleration sensor and the angular velocity sensor of the first controller and information on the operation inputs conducted for the sensor display of the first controller.

The processing of from Step 1204 to Step 1206 is repeated until the application is ended by the user 1.

FIG. 13 is a diagram for illustrating how data is exchanged among the first controller, the apparatus main unit, the second to Nth controllers, and the Kth controller according to at least one embodiment.

The present description has been described above with reference to at least one embodiment, but the present description is not limited to the above-mentioned at least one embodiment. It is to be understood by a person skilled in the art that various modifications can be made to the at least one embodiment as long as the modifications do not deviate from the spirit and scope of the present description described in the appended claims.

The invention claimed is:

1. An apparatus, which is configured to output, to a head-mounted display, a first generated image within a three-dimensional virtual space that changes in association with a motion of a head of a first user wearing the head-mounted display, the apparatus being connected to a plurality of portable controllers through a network, the apparatus comprising:
a transmission portion configured to transmit a two-dimensional game image, which is obtained by simplifying a three-dimensional game image of information on an application selected by the first user who operates the apparatus, to the plurality of portable controllers through the network, and to further transmit positional information on a first object operated by the first user in the application being executed by the first user to the plurality of portable controllers through the network;
a reception portion configured to receive positional information on a second object operated by a second user who operates one controller among the plurality of portable controllers from the one controller through the network based on the positional information on the first object and the two-dimensional game image obtained by simplifying the three-dimensional game image of the information on the application; and
an image generating and outputting portion configured to generate the first generated image within the three-dimensional virtual space, in which the first object and the second object are arranged, based on the positional information on the first object and the received positional information on the second object, and to output the first generated image to the head-mounted display connected to the apparatus.

2. The apparatus according to claim 1, wherein the plurality of portable controllers and the apparatus are connected to each other by a controller-side interface program of each of the plurality of portable controllers, which is received from a server through an external network, and an apparatus-side interface program of the apparatus.

3. The apparatus according to claim 1, wherein the transmission portion is further configured to transmit the received positional information on the second object to other controllers excluding the one controller operated by the second user among the plurality of portable controllers.

4. A system, comprising:
an apparatus configured to output, to a head-mounted display, a first generated image within a three-dimensional virtual space that changes in association with a motion of a head of a first user wearing the head-mounted display, the apparatus being operated by the first user; and
a plurality of portable controllers, which are connected to the apparatus through a network, and are configured to output a second generated image being two-dimensional to displays of the plurality of portable controllers, wherein:
the apparatus comprises:
a transmission portion configured to transmit a two-dimensional game image, which is obtained by simplifying a three-dimensional game image of information on an application selected by the first user, to the plurality of portable controllers through the network, and to further transmit positional information relating to a first object operated by the first user in the application being executed by the first user to the plurality of portable controllers through the network;
a reception portion configured to receive positional information on a second object operated by a second user from one controller through the network based on the positional information on the first object and the two-dimensional game image obtained by simplifying the three-dimensional game image of the information on the application; and
an image generating and outputting portion configured to generate the first generated image within the three-dimensional virtual space, in which the first object and the second object are arranged, based on the positional information on the first object and the received positional information on the second object, and to output the first generated image to the head-mounted display connected to the apparatus;
the one controller of the plurality of portable controllers is operated by the second user; and
the one controller comprises:
a reception portion configured to receive the two-dimensional game image, which is obtained by simplifying the three-dimensional game image of the information on the application selected by the first user, from the apparatus through the network, and to further receive the positional information on the first object operated by the first user in the application being executed by the first user from the apparatus through the network;

a transmission portion configured to transmit the positional information relating to the second object operated by the second user to the apparatus through the network based on the two-dimensional game image obtained by simplifying the three-dimensional game image of the information on the application and the positional information on the first object; and an image generating and outputting portion configured to generate the second generated image being two-dimensional, in which the first object and the second object are arranged and which is generated based on the received positional information on the first object and the received positional information on the second object, and to output the second generated image to the display of the one controller.

5. A non-transitory computer readable medium storing a program for causing a processor to execute a method of outputting, to a head-mounted display of an apparatus, a first generated image within a three-dimensional virtual space that changes in association with a motion of a head of a first user wearing the head-mounted display, the apparatus being connected to a plurality of portable controllers through a network, the method comprising the steps of:

transmitting a two-dimensional game image, which is obtained by simplifying a three-dimensional game image of information on an application selected by the first user who operates the apparatus, to the plurality of portable controllers through the network, and further transmitting positional information on a first object operated by the first user in the application being executed by the first user to the plurality of portable controllers through the network;

receiving positional information on a second object operated by a second user who operates one controller among the plurality of portable controllers from the one controller through the network based on the positional information on the first object and the two-dimensional game image obtained by simplifying the three-dimensional game image of the information on the application; and generating and outputting an image, the step of generating and outputting an image comprising generating the first generated image within the three-dimensional virtual space, in which the first object and the second object are arranged, based on the positional information on the first object and the received positional information on the second object, and outputting the first generated image to the head-mounted display connected to the apparatus.

6. The non-transitory computer readable medium according to claim 5, wherein the plurality of portable controllers and the apparatus are connected to each other by a controller-side interface program of each of the plurality of portable controllers, which is received from a server through an external network, and an apparatus-side interface program of the apparatus.

7. The non-transitory computer readable medium according to claim 5, wherein the step of transmitting further comprises transmitting the received positional information on the second object to other controllers excluding the one controller operated by the second user among the plurality of portable controllers.

8. A method of controlling an apparatus configured to output a first generated image within a three-dimensional virtual space to a head-mounted display, the apparatus being connected to a plurality of portable controllers through a network, the method comprising the steps of:

transmitting a two-dimensional game image, which is obtained by simplifying a three-dimensional game image of information on an application selected by the first user who operates the apparatus based on the first generated image within the three-dimensional virtual space that changes in association with a motion of a head of a first user wearing the head-mounted display, to the plurality of portable controllers through the network, and further transmitting positional information on a first object operated by the first user in the application being executed by the first user to the plurality of portable controllers through the network;

receiving positional information on a second object operated by a second user who operates one controller among the plurality of portable controllers from the one controller through the network based on the positional information on the first object and the two-dimensional game image obtained by simplifying the three-dimensional game image of the application; and generating and outputting an image, the step of generating and outputting an image comprising generating the first generated image within the three-dimensional virtual space, in which the first object and the second object are arranged, based on the positional information on the first object and the received positional information on the second object, and outputting the first generated image to the head-mounted display connected to the apparatus.

9. The system according to claim 4, wherein the first generated image is generated based on a viewpoint different from a viewpoint of the second generated image.

10. The apparatus according to claim 1, wherein the three-dimensional game image is free of the two-dimensional game image.

11. The apparatus according to claim 1, wherein the image generating and outputting portion is configured to generate an image of the second object for displaying the second object on at least the one portable controller usable by the second user, and the reception unit is configured to receive instructions for operating the second object in the VR space from the one portable controller usable by the second user.

\* \* \* \* \*